Jan. 7, 1964 G. M. COANET 3,116,922

RECORD CARDS FEED TRACK

Filed June 7, 1960 6 Sheets-Sheet 1

INVENTOR

GUY M. COANET

Jan. 7, 1964 G. M. COANET 3,116,922

RECORD CARDS FEED TRACK

Filed June 7, 1960 6 Sheets-Sheet 2

INVENTOR

GUY M. COANET

Jan. 7, 1964 G. M. COANET 3,116,922

RECORD CARDS FEED TRACK

Filed June 7, 1960 6 Sheets-Sheet 3

INVENTOR

GUY M. COANET

Jan. 7, 1964 G. M. COANET 3,116,922

RECORD CARDS FEED TRACK

Filed June 7, 1960 6 Sheets-Sheet 4

INVENTOR

GUY M. COANET

Jan. 7, 1964 G. M. COANET 3,116,922

RECORD CARDS FEED TRACK

Filed June 7, 1960 6 Sheets-Sheet 5

INVENTOR

GUY M. COANET

RECORD CARDS FEED TRACK

Filed June 7, 1960

INVENTOR
GUY M. COANET

United States Patent Office 3,116,922
Patented Jan. 7, 1964

3,116,922
RECORD CARDS FEED TRACK

Guy Michel Coanet, Paris, France, assignor to Compagnie des Machines Bull (Société Anonyme), Paris, France
Filed June 7, 1960, Ser. No. 34,402
Claims priority, application France June 11, 1959
4 Claims. (Cl. 271—3)

The continued extension of the applications of record card machines, in combination with the advances made in the electronic numerical computer field, results in the production of assemblies of ever increasing complexity to meet the constantly increasing requirements of users of such machines. For large mechanographical equipment, it has been found necessary to provide multiple-function machines, for example double-track tabulating machines for record cards, punching tabulating machines, collating machines, and the like, but such machines have insufficient adaptability for the economic production and rational development of large mechanographical units.

The present invention relates to improvements in record card machines and has more especially for its object to provide a machine of large capacity which can be readily and economically modified by the addition or substitution of detachable standard specialised functional elements. A machine designed in accordance with the invention also has particular features by virtue of which it is possible to associate in one machine unit a large number of functional elements which are so arranged relative to one another as to have small overall dimensions. Machines designed in accordance with the invention are very widely adaptable, so that it is possible therewith to form and to develop complex assemblies by means of specialised elements each corresponding to a particular elemental function.

The flexibility of machines designed in accordance with the invention is such that it is possible to provide assemblies of high output in which transitory operations such as collating, selection and re-sorting of record cards can be dispensed with.

Figure 1:
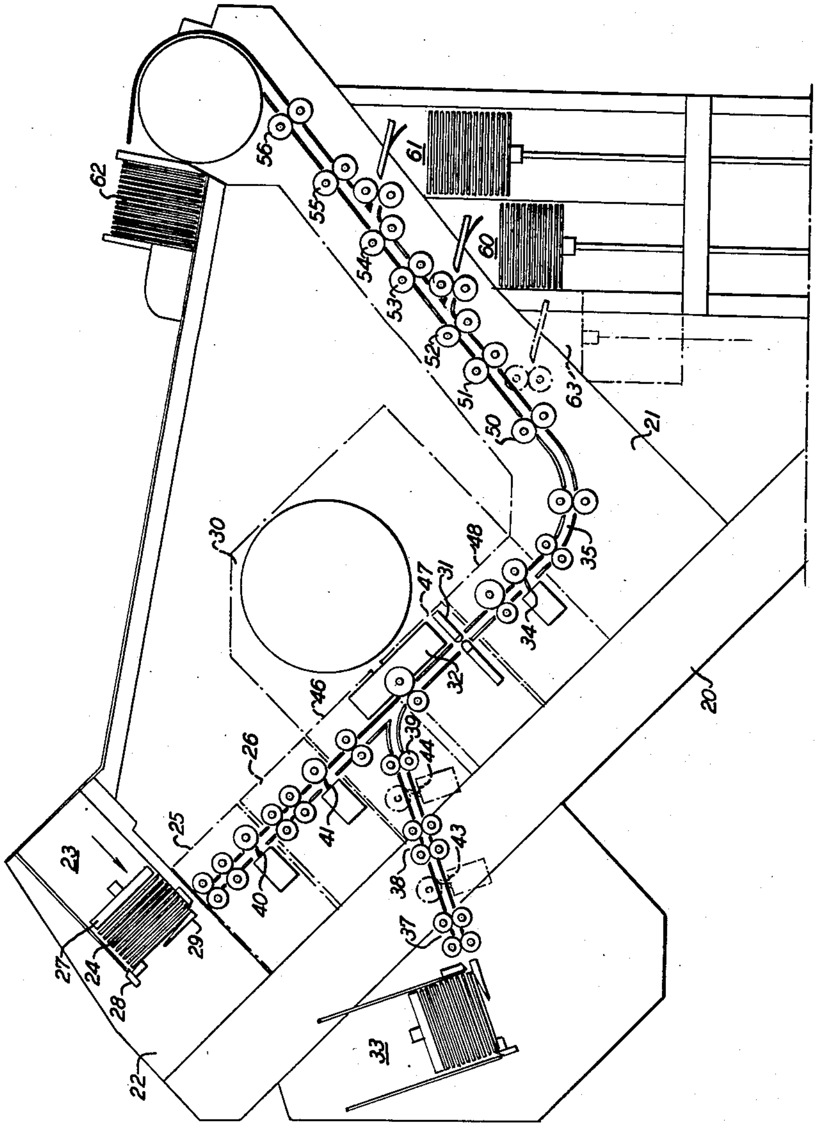
Figure 2A:
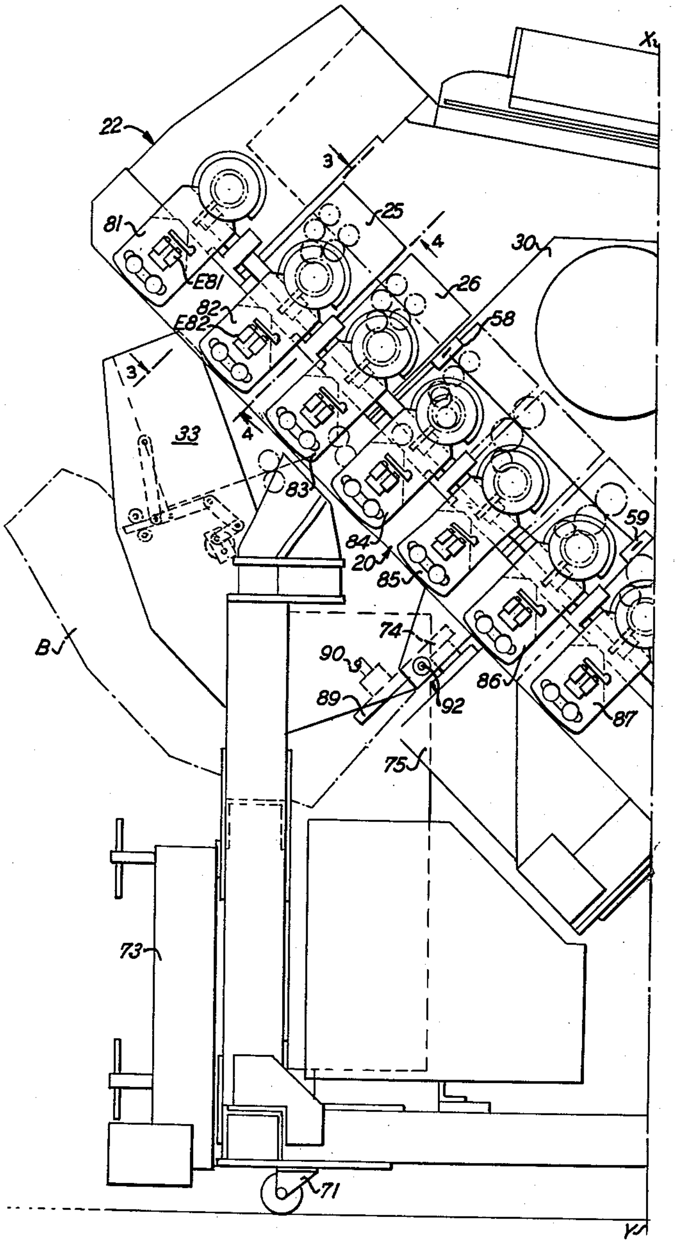
Figure 2B:
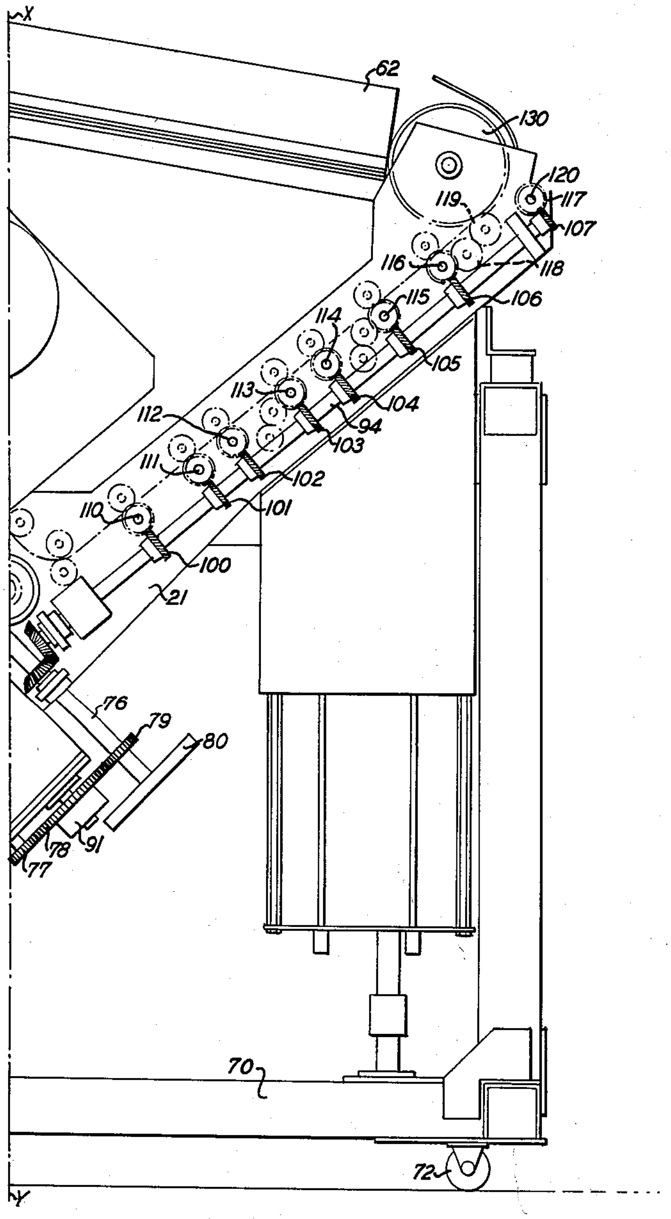
Figure 3:
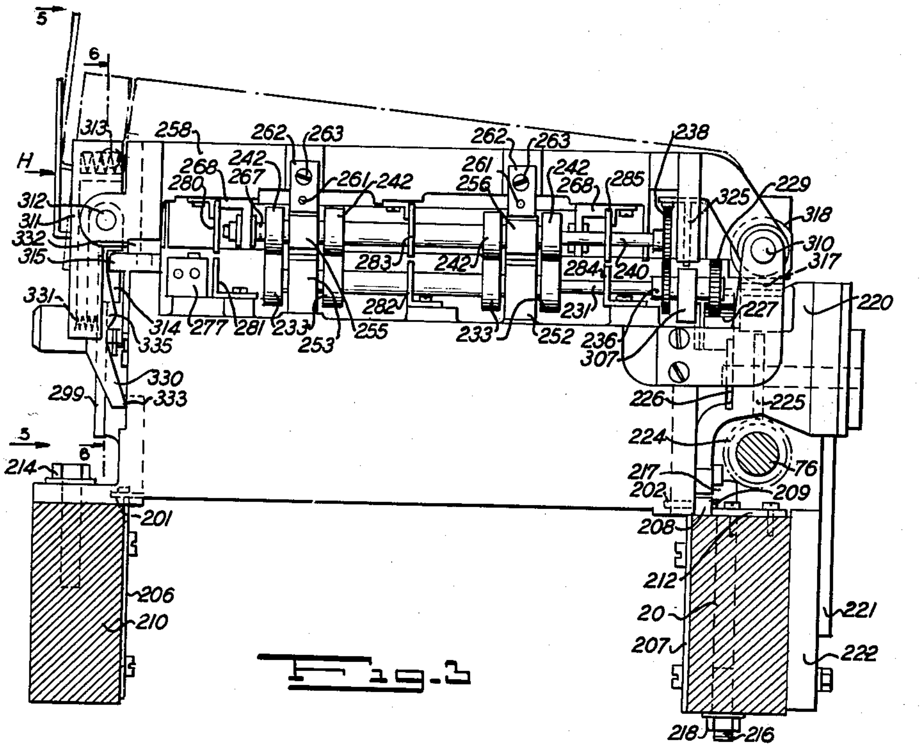
Figure 4:
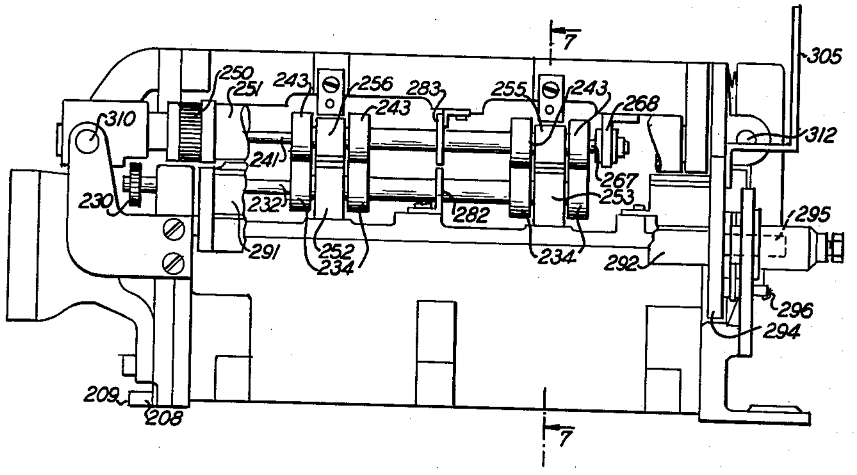
Figure 5:
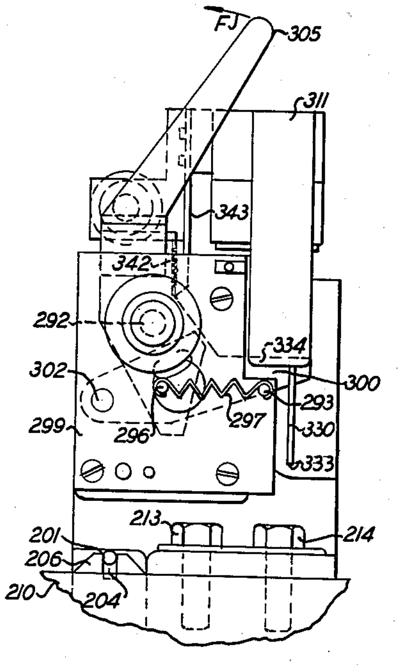
Figure 6:
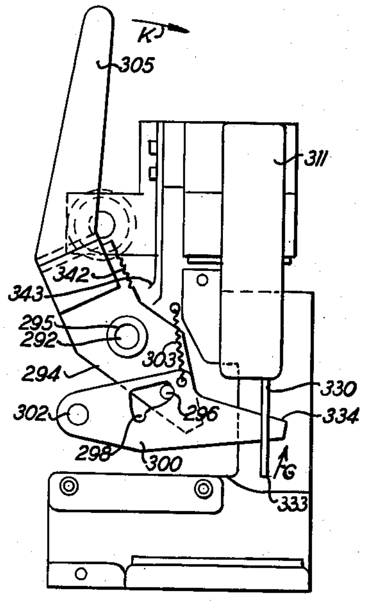
Figure 7:
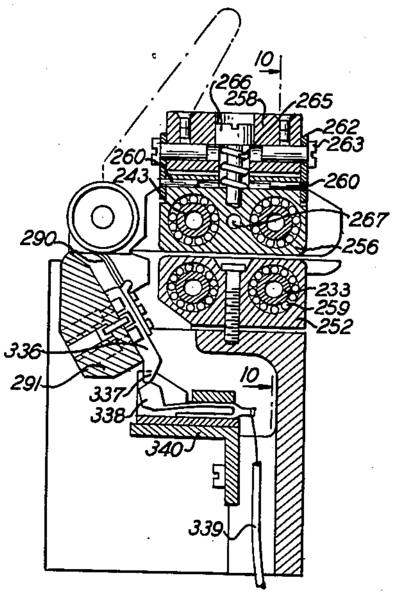
Figure 8:
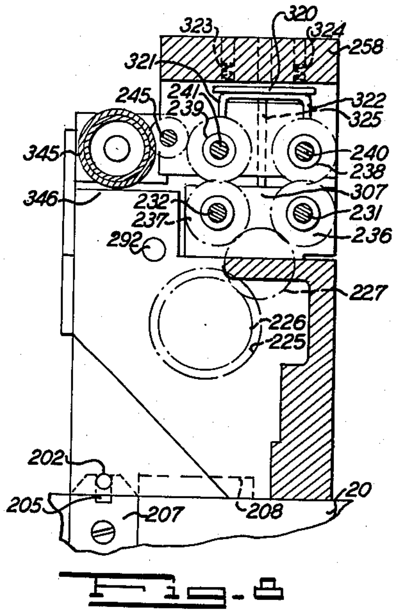
Figure 9:
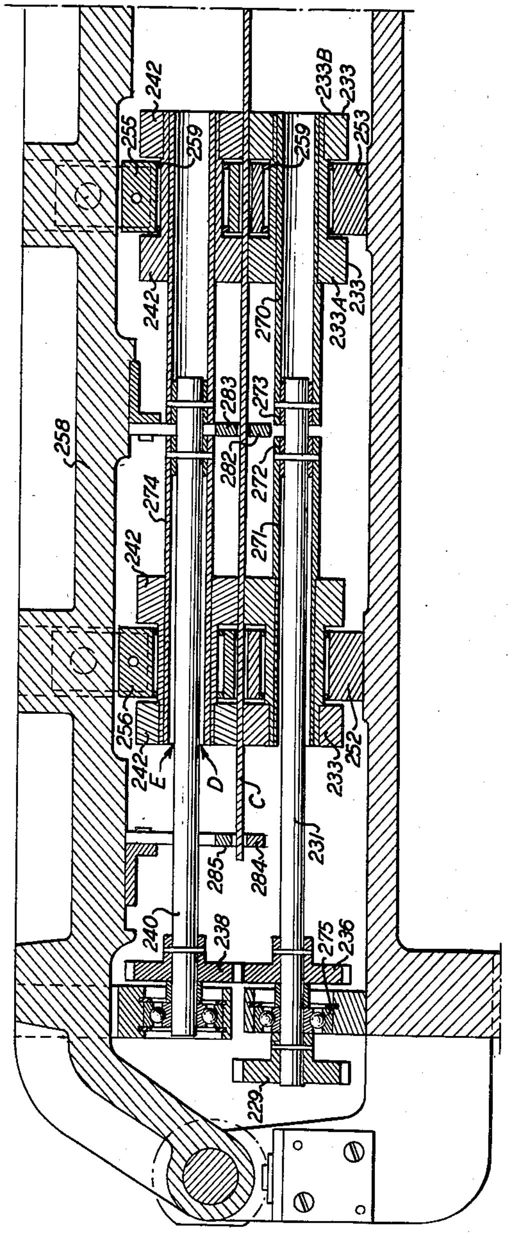

For a better understanding of the invention and the method by which it is to be performed, the same will now be described, by way of example, with reference to the accompanying drawings, in which:

FIGURE 1 is a diagram illustrating the principle of an example of an assembly of specialised standard elements in a machine designed in accordance with the invention, FIGURES 2A and 2B (joined along the line XY) show an external diagrammatic view of a machine designed in accordance with the diagram of FIGURE 1, FIGURE 3 is a sectional view of the machine along the line 3—3 of FIGURE 2A, showing a record card reading and feeding unit, closed and fixed on the frame of the machine, FIGURE 4 is a view (along the line 4—4 of FIGURE 2A) of the reading unit illustrated in FIGURE 3, FIGURE 5 is an external view of a reading unit in the direction of the arrows 5—5 of FIGURE 3, with the reading brush system in the operative position, FIGURE 6 is a view corresponding to FIGURE 5, in which the support plate of the reading brush system has been removed to show the locking members, the said brush system being in the disengaged position (brush out of contact), FIGURE 7 is a section along the line 7—7 of FIGURE 4, FIGURE 8 is a section along the line 8—8 of FIGURE 3, and FIGURE 9 is a fragmentary section along the line 10—10 of FIGURE 7 through a reading and feeding unit, showing the arrangement of the card feeding rollers.

The diagram of FIGURE 1 shows the relative arrangement of the functional elements in a machine designed in accordance with the invention. The machine illustrated by way of example in the said diagram is called a track-reading, punching and selecting machine. The said machine comprises the necessary elements for carrying out record-scanning operations, the punching of data or of results and the selection of the record cards. In this diagram, there is also shown in dash-dotted lines the arrangement of other members which may be provided in the machine to carry out other work. Some details of construction and assembly are shown in the drawing, formed by joining FIGURES 2A and 2B, which in combination are an external view of the machine. The machine comprises a main frame which is formed of two parts 20 and 21 (FIGURES 1, 2A and 2B) consisting of beams assembled together to form an angle. The angle formed in the chosen example is slightly larger than a right angle and forms a V. The main object of this arrangement is to reduce the space occupied by the machine in the longitudinal direction while maintaining the constructional advantages of the rectilinear tracks, which are much more economic to produce than circular tracks or merely curved tracks. Mounted on the part 20 of the frame of the machine are elements which constitute the "supply-reading" part and optionally the "punching" part of the machine, while the part 21 of the frame of the machine supports the "selection and compartments" elements.

Mounted on the part 20 of the frame is the feed unit 22. The said unit fixedly mounted on the frame 20, however, is detachable to facilitate inspection and maintenance of the parts of which it consists. Record cards 24 are disposed in a compartment 23 in which they are subject to the pressure of a weight 27. The cards can be extracted one by one from the magazine by a device comprising a knife 28 and an outlet 29. Many constructional forms of this mechanism are known, which will not be described. After the feed unit, there are secured to the frame 20 two record card feeding and reading units 25 and 26. A particularly advantageous constructional form of such units will hereinafter be described within the scope of the invention. After the reading and feeding units 25 and 26, the track is continued in a punching unit 30. Mechanisms of this type are known in which the record cards are advanced step-by-step and punched line-by-line. A particularly advantageous form of a line-by-line punching device has been described in U.S. Patent No. 3,017,077 granted to Herpin January 16, 1962. In this device, the record cards are advanced line-by-line under a row of punches 31 by means of a reciprocating mechanism 32. Data can thus be punched into record cards emanating either from the main supply compartment 23 or from a secondary supply compartment 33. The punching device is provided with a reading brush arrangement 34 for scanning the particulars punched in the cards. On leaving the punching unit, the cards are engaged in a curved passage 35, from which they are transmitted to the "selection and compartments" part of the machine. In the example illustrated in FIGURES 1 and 2A, the compartment 33 is a compartment for the supply of blank cards. These cards, which are intended to have the results of computations or balances punched therein, are advanced towards the punching mechanism by means of two sets of feed rollers 37, 38 and 39. The reading and feeding units 25 and 26 are shown provided with scanning brush arrangements 40 and 41. The track along which the cards emanating from the auxiliary compartment are advanced may also be provided with scanning brush arrangements 43 and 44 (shown in dash-dotted lines). Since the brushes of the two tracks are connected to respective comparing devices, the machine can carry out in known manner operations of collating cards emanating from the two magazines. In order to join the card feeding tracks, it is possible in this case to mount in place of the punching unit 30 a combining unit 46 which connects the two tracks and of which the contour is represented by dash-dotted lines and whose internal arrangement is clearly visible in FIGURE 1. Following the combining unit, there may be mounted on the frame 20 two reading and feeding units 47 and 48 similar to the units 25 and 26, the contour of the units 47 and 48 only being shown in dash-dotted lines. These two units may be used, for example, to check the sequence (in increasing or decreasing order) of the particulars on the cards advanced along the track from two supply compartments. Depending upon the applications, the secondary supply compartment 33 may be omitted and the combining unit 46 replaced by a standard reading and feeding unit. In the various applications of the machine, it is not always necessary for the "reading and feeding" units all to be provided with a scanning brush arrangement and with a contact roller. In such cases, some units may be mounted without a scanning brush arrangement and without a contact roller, but they are then provided with special guides which guide the cards to the feed rollers of the succeeding unit, as will hereinafter be shown.

The part 21 of the machine, called the "selection and compartments" part is provided (FIGURE 1) with pairs of card feed rollers 50, 51, 52, 53, 54, 55 and 56 and selecting means which direct the record cards either into the plate compartments 60 or 61 or towards a drum compartment 62 of large capacity (3,000 cards). The rollers 50 and 51 are arranged to permit, when necessary, the attachment of a third plate compartment 63, the positioning and introducing means of which are shown in dash-dotted lines in FIGURE 1. The card selecting means may be devices comprising flaps or blades or any other known selecting means widely employed in, for example, machines for sorting or collating record cards.

As already stated, the machine illustrated by way of example (FIGURES 1, 2A and 2B) is a machine provided with devices for scanning punching and selecting record cards, with a secondary supply magazine which may supply blank cards to the punching device. This machine operates cyclically, like the great majority of record card machines. In the present case, the duration of a machine cycle is, for example, the time necessary for the passage of a record card from a given position in one reading unit to the same position in the succeeding reading unit if the movement of the card is not interrupted. The supply magazines are designed to be able to supply a card at each machine cycle at a speed of operation of 300 cycles per minute, but these machines can operate correctly at higher speeds.

In FIGURES 2A and 2B, combined, the main frame of the machine is supported by a secondary frame 70 which rests on the ground on castors 71 and 72. This frame supports the auxiliary members of the machine, such as the switchboards 73, cable junction boxes and control circuits.

Detachable casings (not shown) are secured to the frames of the machine in order to protect the mechanisms, while permitting free access to the manipulating members.

The various mechanical parts of the machine, are driven from a main motor 75. This motor is provided at each shaft end with toothed wheels 74 and 77 which transmit the movement to the various parts of the machine. A main transmission shaft 76 is driven by the motor 75 through toothed wheels 77, 78 and 79. A handwheel 80 permits of manipulating the shaft 76 in order to check or correct the adjustments of the machine. A non-return device 91 of known form prevents the driving shaft from rotating in a direction opposite to the normal direction of rotation.

The mechanisms of the reading-punching track are driven by the shaft 76 through clutch mechanisms 81, 82, 83, 84, 85, 86 and 87. These clutches are, for example, of the type described in British Patent No. 926,637 generally known as "one revolution clutches." The mechanism of each clutch is controlled by an electromagnet E81 (for the clutch 81), E82 (for the clutch 82), etc. The energisation of one of these electromagnets at the end of one cycle starts the drive of the mechanism controlled by the corresponding clutch, during the succeeding cycle. A clutch 81 is provided for the main supply unit 22. When the electromagnet E81 (FIGURE 2A) is energised at the end of a cycle, a record card is extracted from the card magazine 23 during the succeeding cycle. Simultaneously with the electromagnet E81, the electromagnet E82 must be energised to bring the record in front of the scanning brush arrangement 40 of the reading unit 25 (FIGURE 1). The record cards can thus be advanced or stopped in the track according to whether the electromagnets of the clutches are energised or not. Since the present invention only relates to mechanical arrangements, the electric circuits for controlling the mechanisms will not be described, but a person skilled in the art can readily construct a machine in accordance with the principles here described and operate it by utilising electrical arrangements well known in the record card machine field.

It has become current practice to employ for operations for preparing accounts in respect of water, gas or electricity, or for producing orders for the sale or purchase of stocks and shares, or for other operations, record cards which have been automatically punched in accordance with marks or manuscript particulars entered on the cards. This manner of operation frequently has the disadvantage that it produces cards which have been more or less folded, creased or deteriorated in various ways. Consequently, such cards frequently have difficulty in passing correctly through the machine and sometimes cause what are known as "stoppages." Arrangements are known for immediately stopping the machine when such an incident occurs, but in machines as hitherto constructed it is sometimes necessary to tear cards into small pieces in order to remove them from the machine, whereby great difficulties are caused in thereafter preparing fresh cards to replace those thus damaged. In order at least partially to obviate these disadvantages, the reading and feeding units of the main track of the machine are adapted to open, that is to say, they are provided with hinges and locking devices which will hereinafter be described and by means of which the units in which cards have been blocked can be opened. The punching unit 30 is provided with similar arrangements and the upper part of the unit (FIGURE 2A) can pivot on hinges 58 and 59 fast with the lower part of the said unit, which is fixed to the frame 20 of the machine. The record cards thus extracted from the machine are generally only creased and it is relatively easy to have them reproduced without errors.

The mechanism for feeding cards from the secondary supply mechanism 33 and the groups of feed rollers 37 and 38 for the record cards of the secondary track are actuated by the motor 75 through clutches (not shown) similar to the clutches 81, 82 and 83 of the main track. the movement of the motor 75 is transmitted to a driving shaft 90 through toothed wheels 74 and 89. The said shaft drives the clutches of the secondary track, and the shaft 76 similarly drives the clutches of the main track.

It is to be expected that card stoppages may also occur in the secondary track and it must be possible to extract the blocked cards. For this purpose, the secondary track assembly is arranged to pivot about a pin 92 (FIGURE 2A. The secondary supply magazine may also be brought to the position illustrated in dash-dotted lines at B (FIGURE 2A). In this position, the upper part of the secondary track is accessible for releasing the blocked cards. The said track can then be returned to its operative position and locked in this position by a locking device not shown. The shaft 90 and the toothed wheel 89 are fast with the secondary track and rock therewith about the pin 92. The toothed wheels 74 and 89 are so disposed in relation to the pin 92 as to remain engaged despite the rocking of the secondary track assembly about this pin. This arrangement has been provided in order to maintain the adjustments of the said secondary track in relation to the main track. It is thus possible to turn the mechanisms of the open secondary track by means of the hand wheel 80, simultaneously with the mechanism of the main track.

The mechanical elements of the selecting track, which are mounted on part 21 of the main frame, are driven (FIGURE 2B) by a shaft 94 on which is mounted helical wheels 100 to 107 which mesh with other helical wheels 110 to 117 keyed on the shafts of the mechanisms to be driven. The wheel 106 drives through wheels 116, 118 and 119 a card ejecting mechanism comprising a drum 130 which stacks record cards one by one in the compartment 62 of large capacity. The wheel 107 drives the wheel 117, which is keyed on a shaft 120 on which are mounted cam-operated contacts of known type.

FIGURES 3 to 8 and FIGURE 9 show a number of constructional details of a unit for feeding and reading record cards.

FIGURE 3 is a section along the line 3—3 of FIGURE 2 and shows a feeding and reading unit mounted on frame 20 of the machine. The said unit comprises two parts, which may be considered separately. The first part, which is for the feeding of the cards, comprises feed rollers which are mechanically driven. The second part comprises a contact roller and a brush arrangement which consists of a row of brushes for scanning the data recorded on the cards. The scanned data may be either conductive marks which establish electrical connections between adjacent brushes or perforations through which electrical contacts can be established between brushes and the contact roller. By way of indication, the machine illustrated in FIGURES 1, 2A and 2B may be used to convert conductive graphic marks applied by hand into perforations situated in predetermined positions on the same card, or on other cards, in accordance with a known method. Record cards provided with conductive marks are scanned, for example, by the brush arrangements 40 or 41 (FIGURE 1). The data scanned in a card are introduced in known manner into a storage device and then transmitted to the punching device, which punches the data in predetermined positions in the card during the passage of the latter through the punching device. The data thus punched are thereafter scanned by the brush arrangement 34 and compared with the data contained in the storage device. When a difference between the graphic data scanned and introduced into the storage device and the data actually punched in a card is observed, the erroneous cards are sorted into a special compartment. Scannning of graphic marks on record cards is always more or less unreliable by reason of the imperfect contacts frequently obtained between the conductive marks and the scanning brushes. A machine comprising the arrangement illustrated in FIGURE 1 permits of at least partially obviating this disadvantage by introducing into the storage device data which are successively scanned by the two brush arrangements 40 and 41. Since the two brush arrangements have no characteristics of contact with the absolutely identical conductive marks, it is possible for a mark not scanned by one brush arrangement to be scanned by the other.

In a unit comprising a part for feeding the cards and a part for reading, each part comprises a lower portion fixed to the frame of the machine, and an upper portion which can be opened by pivoting it about a fixed pin. Locking means are provide to main the unit normally in the closed position. The lower part of the feeding and reading unit comprises a base 200 which is provided with centering means for correctly securing it on the frame of the machine. Two studs 201 and 202 are fitted in the base and can be engaged (FIGURES 3, 5 and 8) in recesses 204 and 205 formed in blades 206 and 207 fixed to the beams 20 and 210 respectively of the frame of the machine. The said studs serve to centre the unit in the longitudinal direction of the machine in relation to the frame. The base of each unit is provided with a boss 208, of which one face 209 is accurately trued and abuts a plate 212 fixed on the beam 20. The position of the said plate determines the lateral centering of the unit on the frame of the machine. When a unit is in position, it is fixed to the frame of the machine on the one hand by means of two screws 213 and 214 (FIGURES 3 and 5) which are screwed into the beam 210, and on the other hand by means of a bolt 216 which is provided with a lug 217. The lug is brought on to the boss 208 by pivoting, whereafter the unit is secured by tightening the nut 218. The mechanism of a unit is driven by the shaft 76 through a one-revolution clutch mechanism, for example of the type described in the above-mentioned British patent No. 926,637. The said clutch comprises an upper portion 220 which is fixed to the base of the feeding and reading unit and comprises the engaging devices while the lower portion 221, which comprises the clutch control devices, is fixed to the beam 20 of the frame of the machine through an adjusting support 222. A helical wheel 224 keyed on the shaft 76 is in engagement with a helical wheel 225 for driving the clutch mechanism (FIGURES 3 and 8). When the clutch mechanism is engaged, a toothed wheel 226 is rotated, this wheel being in engagement with an intermediate wheel 227 which is in turn in engagement with two other toothed wheels 229 and 230 (FIGURES 3 and 4) which are keyed on the shafts 231 and 232 respectively, on which are mounted the lower card feed rollers 233 and 234. Keyed on the shafts 231 and 232 are pinions 236 and 237 (FIGURES 3 and 8) which engaged with other pinions 238 and 239 respectively, which are keyed on shafts 240 and 241 respectively, on which are mounted the upper feed rollers 242 and 243. A small pinion 245 (FIGURE 8) meshes on the one hand with the pinion 239 and on the other hand with a toothed wheel 250 (FIGURE 4) keyed on the contact roller 251. The wheel 250 has a number of teeth slightly smaller than the number of teeth on the wheel 239 in order that the contact roller may turn slightly more quickly than the card feed rollers. The lower rollers 233 and 234 are mounted so as to rotate freely in double bearings 252 and 253 fixed to the base 200. The upper rollers 242 and 243 are mounted so as to rotate freely in double bearings 255 and 256 which are fast with a support 258 forming a cover of the unit. FIGURE 7 is a sectional view along the line 7—7 of FIGURE 4 showing in detail the mounting of the bearing 256.

The rollers 242 and 243 are arranged to turn freely in the double bearing 255 through bearing needles 259. The bearing is provided with pins 260 engaged in holes 261 (FIGURE 3) formed in plates 262 fixed to the cover 258 by screws 263. A spring 265 engaged partly in the cover and partly in the bearing 256 urges the latter downwards, but it is retained by pins 260. A screw 266 is provided for adjusting the pressure of the spring on the bearing. The double bearings 255 and 356 both have extending therethrough a bar 267 (FIGURES 3, 4 and 7) which is guided in guide members 268 which permit a vertical displacement of the double bearings, but prevent any lateral displacement. The plates 262 are so adjusted that, in the absence of cards, the upper and lower rollers are maintained at a distance apart substantially equal to half the thickness of a record card by the pins 260.

FIGURE 9, which is a large-scale view partially in section along the line 10—10 of FIGURE 7, shows in detail the mounting of the driving rollers 233 and 242 on their shafts. This arrangement has the object of reducing damage to the edge of the cards, especially when the latter are engaged between the rollers. It is intended for this purpose to reduce the effects produced by the inertia of the rollers and substantially to eliminate the variations of the distances between the centres of the gearings 236 and 238 when a card passes between rollers. It will be seen from FIGURE 9 that the rollers proper, for example the rollers 233, are formed in two parts, one part 233A and one part 233B. The part 233A is provided with a tubular portion 233C. This tubular portion is fitted in the part 233B and forms a rolling track for the needles 259. The rollers 233 are in turn fitted on tubes 270 and 271. The tubes 270 and 271 are mounted on one end of the shaft 231 through tubes 272 and 273 and are cottered together. The shaft 231 on which the pinions 229 and 236 are mounted is maintained at its other end in a ball bearing 275. Under these conditions, any difference in alignment between the bearings 252, 253 and the ball bearing 275 is compensated for by deflection of the shaft 231, whereby any stress in the bearings is eliminated. The bearings 252 and 253 are fixed on the base 200, but the bearings 255 and 256 are raised by the passage of a record card between the rollers. In FIGURE 9, the thickness of a card C and its consequences on the device have been deliberately exaggerated. The bearings 255 and 256 are shown lifted by the thickness of the card, which does not conform to what has hereinbefore been stated. This has been done in order to show that the differences in spacing which are set up at D and E between the shaft 240 and the tube 274 supporting a roller have no substantial effect upon the distance between centres of the pinions 236 and 238. Moreover, this lightened construction of the rollers reduces the shock due to inertia to which the forward edge of a card must undergo in order to move the rollers apart. Card guides 280 to 285 serve to guide the cards so as to engage them correctly between the rollers.

A card contact 277 of known arrangement is provided (FIGURE 3) to close an electric contact when a card passes through a unit or is stopped therein. FIGURE 7 (section along the line 7—7 of FIGURE 4) also shows the arrangement of the brush support system in the unit in relation to the contact roller. The brushes 290 are mounted on an insulating support 291 pivotally mounted on a pin 292 (FIGURES 4, 5, 6 and 8). The said support is fast (FIGURE 4) with a plate 294 in which is mounted a pin 295 on which the brush support is pivotally mounted. The said blade is provided with a dog 296 with which there is engaged a spring 297, of which the other end is engaged with a dog 293 fast with the plate 299 fixedly mounted on the base 200. The said spring tends to pivot the brush support in the direction of the arrow F (FIGURE 5). In this figure, the dog 296 is engaged in a recess 298 formed in a locking plate 300 (FIGURE 6). The locking plate 300 is pivotally mounted on a pin 302 fixedly mounted on the plate 299. A spring 303 urges the locking plate 300 in the direction of the arrow G. It is obvious that, with the brush support in the position illustrated in FIGURES 5 and 7, lowering of the locking plate 300 in the direction opposite to the direction of the arrow G results in release of the dog 296 and rocking of the brush support under the action of the spring 297 as illustrated by the position of a lever 305 fast with the plate 294 of the brush support.

The cover support 258 of the feeding and reading unit is pivotally mounted on a pin 310. The cover support is provided with a rocking lever 311 to lock it in the closed position. The said lever is pivotally mounted on a pin 312 fast with the cover. A spring 313 (FIGURE 3) situated in a recess in the lever tends to bring it to a locking position. In this position, a boss 314 fast with the said lever takes up a position below another boss 315 which is fast with the base and locks the cover in the closed position. In order to open the unit, it is merely necessary to exert a pressure in the direction of the arrow H on the rocking lever 311 and to raise the cover at the same time. FIGURE 3 shows in dash-dotted lines the cover support 258 in a semi-open position. The cover may be opened at 90°, in which position it is maintained by a leaf spring 317 which bears on a flat 318 formed in a member fast with the cover. Mechanical means are generally provided to ensure that when the machine stops the transmission shafts are stopped in a preferential angular position determined with a view to the succeeding start of the machine. Opening of the cover of a unit disengages the pinions 238 and 239 (FIGURES 3 and 8) from the teeth of the pinions 236 and 237, which are held fast in a predetermined position by the stopping of the machine. It is therefore necessary to hold fast the pinions 238 and 239 in the position in which they are at this instant in order that their teeth may correctly re-engage when the cover is closed. A device is therefore provided to lock the said pinions 238 and 239 when the cover is opened. In FIGURE 8, a bar 320 is provided with two teeth 321 and 322. Springs 323 and 324 force the teeth of the bar towards the teeth of the pinions. When the cover is closed, a rod 325 fast with the bar bears against the bearing 307, compresses the springs 323 and 324 and moves the teeth 320 and 321 of the bar away from the teeth of the pinions, but when the cover is opened the rod 325 no longer bears on the bearing 307 and the teeth 321 and 322 become engaged in the teeth of the pinions 238 and 239 under the action of the springs 323 and 324. The said pinions are then locked. Closing of the cover results in pushing of the rods 325 and release of the pinions 228 and 229, which are in the position for correctly engaging the pinions 236 and 237.

In devices for reading record cards by means of contact brushes, it is very important to protect the said brushes from any damage due for example, to bending back of the bristles. The bent-back bristles remain deformed and leave the tuft of the brush, and are also likely to produce contacts either with the bristles of neighbouring brushes in the brush arrangement or to come into contact with the contact roller through a perforation situated in an adjacent column in the card. The contact bristles of a brush, when they are free, are generally straight, while in the operating position (FIGURE 7) they are bent so as to exert an appreciable pressure on the contact roller. Consequently, when the reading unit is opened, the brushes which were bent by the contact roller straighten. If, after opening of the unit, the cover were closed again on the brushes in this position, the bristles would "stick" into the roller and would be "bent back." In a machine designed in accordance with the invention, a number of means may be provided in combination to obviate this disadvantage.

The rocking lever 311 (FIGURES 3, 5 and 6) comprises interiorly a tripping lever 330. The latter lever is provided with a projection 335 and is pivotally mounted on the pin 312. A spring 331 urges it towards an abutment 332. The operation of the device is as follows. When the brushes are in the operating position (FIGURE 7), they are maintained in this position by the dog 296 (FIGURES 5 and 6) which is at this moment engaged in the recess 298 in the locking plate 300, which is in the position illustrated in FIGURE 5. Opening of the unit has no effect on the brush holder, but when it is closed, before the contact roller comes into contact with the brushes, the end 333 of the tripping lever 330 abuts the upper edge 334 of the locking plate. Lowering of the cover of the unit results in lowering of the locking plate 300. Before the brushes come into contact with the contact roller, the dog 296 (FIGURE 6) is disengaged from the recess 298 and, under the action of the spring 297 (FIGURE 5), the brush holder is tilted into the position indicated by the lever 305 (FIGURE 6). As the cover continues to descend, the projection 335 of the lever 330 encounters the boss 332. The lever 330 is forced back by the said boss and becomes disengaged from the plate 300. At the end of the movement, the boss 314 fast with the rocking lever 311 takes up a position below the boss 332 and the cover is locked in the closed position (FIGURE 3). A push exerted on the lever 305 in the direction of the arrow K (FIGURE 6) returns the brushes into the operating position against the contact roller (FIGURE 7), in which they are maintained by the locking device (position illustrated in FIGURE 5).

The reading brushes 290 are fixed in the brush holder 291 by means of contact bars 336 (FIGURE 7). The said bars are each provided with a rounded portion 337 which, when the brushes are brought into the operating position, bears against a contact member 338, to which there is connected an electrical link 339, through which the electric current collected by a brush is transmitted to the circuits of the machine. The contact members 338 are insulated from one another and fixed to a support 340 which may be fast either with the base of the unit or with the frame of the machine. In accordance with what has been said in the foregoing, the tripping of the safety device of the reading brush arrangement can automatically come into operation from the instant when, as a result of opening of the cover of the unit, the end 333 of the tripping lever 330 has been brought above the upper edge 334 of the locking plate 300. If the cover were again lowered before this condition were fulfilled, the bristles of the brushes of the reading brush arrangement might be seriously damaged. In order to obviate this disadvantage, the plate 294 of the brush holder is provided with teeth 342 with which there are engaged spring pawls 343 when the brushes are in the operating position (FIGURE 5). Under these conditions, if the cover is opened, the pawls permit the opening of the said cover by moving from one tooth to the other, but the pawls prevent closing of the cover as long as it has not been brought to the position in which the end of the lever 330 has passed above the edge 334 of the locking plate 300. Rocking of the brush arrangement due to the lowering of the locking plate 300 (FIGURE 6) results in the teeth 342 being withdrawn from the pawls and permits closing of the cover, the brushes being spaced away from the contact roller.

It may happen, as already stated, that in a construction of a machine conforming to predetermined requirements it is not necessary for all the feeding "and reading" units to be provided with reading devices. In this case, the contact roller, the scanning brush arrangement and the support 340 of the contact members are omitted, as also are the safety devices of the brushes. Since the guiding of the cards from one unit to the succeeding unit is no longer correctly ensured, the card guides 280, 281, 282, 283, 284 and 285 are replaced by longer guides, the form of which is illustrated in dash-dotted lines 345 and 346 (FIGURE 8). It will be understood that the arrangements described by way of example have no limiting character and that any modifications, adaptations, omissions and substitutions are possible in accordance with requirements and in accordance with the applications without departing from the spirit of the invention.

I claim:

1. A record card machine comprising: a frame, a plurality of primary gearing means located in regularly spaced positions along said frame, means for simultaneously driving said primary gearing means, and a plurality of detachable units each comprising a secondary gearing means, a card feed track portion, means for feeding a card along said track portion, means for coupling said card feeding means to said secondary gearing means and a support for carrying said secondary gearing means, said track portion, said feeding means and said coupling means of the unit, each unit further comprising fastening means which enable it to be secured on said frame in anyone of a plurality of positions where its secondary gearing means can engage one of said primary gearing means, the different units of said plurality of units being positioned with their secondary gearing means each in engagement with a different one of said primary gearing means so as to form an uninterrupted card feed track along which a card can travel by being fed successively through said different units.

2. A machine according to claim 1, wherein the card feeding means of a detachable unit comprise:

a first, a second and a third bearing a transmission shaft capable of deflection and having one end maintained in said first bearing and rotatively coupled to the second gearing means of said detachable unit a tubular body in axial alignment and in driving connection at its centre with the other end of said transmission shaft and two card feed rollers fitted on said tubular body, one at each end of said tubular body, said card feed rollers being mounted so as to rotate freely in said first and in said second bearings respectively.

3. A cyclically operating record card machine comprising:

a frame a plurality of primary gearing means located in regularly spaced positions along said frame means for simultaneously driving said primary gearing means and a plurality of detachable units for making up an uninterrupted card feed track, each comprising a secondary gearing means, a card feed track portion wherein a start position for a card is defined, means for feeding a card along said track portion, means including clutch means for coupling said card feeding means to said secondary gearing means, and a support for carrying said secondary gearing means, said track portion, said feeding means and said coupling means of the unit, each unit further comprising fastening means which enable it to be secured on said frame in anyone of a plurality of positions where its secondary gearing means can engage one of said primary gearing means, the different units of said plurality of units being positioned with their secondary gearing means each in engagement with a different one of said primary gearing means, whereby a driving connection is completed between said driving means and the feeding means of each unit, the several driving connections being so adapted that a first unit among said detachable units can feed a card to the start position of the next succeeding unit along the track in a cycle at the beginning of which said card lies in the start position of said first unit and during which the clutch means of said first unit is operated, at least one of said unit comprising means to perform a predetermined operation when a card is fed through such a unit.

4. A machine according to claim 3, which comprises a secondary card feed track assembly and a separate primary gearing means located on said frame, and in which one of said detachable units is provided with means for feeding cards emanating from said secondary card feed track assembly into said uninterrupted card feed track, and in which said secondary track assembly comprises a secondary gearing means in engagement with said separate primary gearing means, said secondary track assembly being adapted to pivot about a pin so disposed in relation to said separate primary gearing means that said primary and secondary gearing means remain in engagement despite the rocking of the assembly.

References Cited in the file of this patent

UNITED STATES PATENTS

| | | |
|---|---|---|
| 2,046,001 | Scharr | June 30, 1936 |
| 2,063,481 | Bryce | Dec. 8, 1936 |

| | | |
|---|---|---|
| 2,377,525 | Schutt | June 5, 1945 |
| 2,412,527 | Mills et al. | Dec. 10, 1946 |
| 2,627,203 | Hessert | Feb. 3, 1963 |
| 2,726,860 | Luhn | Dec. 13, 1955 |
| 2,775,298 | Rubidge et al. | Dec. 25, 1956 |
| 2,813,718 | Placke et al. | Nov. 19, 1957 |
| 2,883,929 | Eichenbaum et al. | Apr. 28, 1959 |
| 2,936,170 | Herrick et al. | May 10, 1960 |
| 3,015,264 | Carroll et al. | Jan. 2, 1962 |